United States Patent [19]
Cann et al.

[11] 4,456,860
[45] Jun. 26, 1984

[54] X-Y POSITIONING SUBSYSTEM ELECTRONICS

[75] Inventors: George W. Cann, Lagrangeville; Donald E. Davis, Wappingers Falls; Ralph R. Trotter, Hopewell Junction, all of N.Y.

[73] Assignee: IBM Corporation, Hopewell Junction, N.Y.

[21] Appl. No.: 342,321

[22] Filed: Jan. 25, 1982

[51] Int. Cl.³ .............................................. G05B 13/00
[52] U.S. Cl. ...................................... 318/561; 318/632
[58] Field of Search ................ 318/561, 632, 631, 640

[56] References Cited

U.S. PATENT DOCUMENTS

| | | | |
|---|---|---|---|
| 3,179,865 | 4/1965 | Carton | 318/631 |
| 3,824,438 | 7/1974 | Wiebe | 318/631 |
| 3,917,930 | 11/1975 | Davey | 318/561 |
| 4,074,178 | 2/1978 | Bower | 318/631 |
| 4,262,239 | 4/1981 | Kawa | 318/561 |

Primary Examiner—B. Dobeck
Attorney, Agent, or Firm—Sughrue, Mion, Zinn, Macpeak & Seas

[57] ABSTRACT

An X-Y positioning system for electron beam lithography employs an adaptive drive system for feedback control. A gradually increasing drive voltage, superimposed upon a step wave, is summed with the position error signal to achieve position within the system deadband zone. The drive voltage, while superimposed upon the error voltage, increases until mechanical friction and drift in the deadband zone are overcome. A function generator alters the error signal such that the combined error signal and drive voltage cause the system to approach the null point minimizing servo oscillations. A limit circuit determines when the system has reached a set of inner limits and generates an operative output signal to the signal controller which continues until the position exceeds a second, outer set of limits.

11 Claims, 7 Drawing Figures

XY POSITIONING SERVO LOOP

INCREMENTAL SERVO LOOP COMPONENTS

I RAMP-UP TIME (ACCELERATION)
II CONSTANT VELOCITY
III RAMP-DOWN TIME (DECELERATION)

X-Y POSITIONING SUBSYSTEM ELECTRONICS

BACKGROUND OF THE INVENTION

1. Field of the Invention

This invention relates to an X-Y positioning system and in particular, to an ultra precise and fast electronic positioning system for use with electron beam lithography.

2. Prior Art

Electron beam lithography systems are employed as tools for the formation of integrated circuit devices. Exceptional precision and high throughput are desired characteristics of E-beam lithography systems. A standing requirement in this technology is to define an apparatus which can be used to position the target, that is, the semiconductor wafer or glass mask under the E-beam for processing. Such a positioning system must offer exceptional accuracy, compatible with that of the E-beam system itself, yet have adequate speed during the positioning sequence and operations to not hinder the overall throughput in the system.

Typically, such systems are used for orthogonal, X-Y positioning and are used to move a table carrying the wafer within a specified range, for example, 200 mm, yet within that range establish a relative position of the table, vis-a-vis the electron beam to within exceptionally high tolerances. Contemporary positioning tolerances are within the range of $\pm 0.04 \times 10^{-3}$ mm. Moreover, the positioning system must be capable of moving from one location to another in the shortest possible time to improve the total throughput of the E-beam lithography tool. Typically, move times for a 5 mm reposition in the order of 125 ms have been achieved within the prior art servo systems and have been employed in positioning circuits using active position information feedback.

There is, however, a fundamental trade-off when conventional prior art servo systems are employed between absolute positioning accuracy and speed of movement. The trade-off is conventionally expressed as one of energy management, that is, a first criteria of supplying enough energy to the system to move it quickly from one position to another and to then supply sufficient energy to the system as the X-Y stage is being braked to a stop. The stopping of the table with the minimum amount of residual oscillation or "ringing" requires that an exact amount of energy by applied to the stage at all times. Accordingly, the achievement of fast move times requires that the table be stopped with the minimum of ringing.

The problem of energy management in the fundamental trade-off is compounded by considering the relative dimensions which are subjected to this energy application. For example, within the dimensional range of 0.04 μm, structural members which can normally be considered as rigid, become non-rigid. Hence, to prevent undue stresses on these members, and yet quickly dampen out undesirable effects (ringing), requires that energy applied during the stopping be applied in a measured manner in order to more quickly establish the absolute true position of the table.

A prior art system using a feedback servo loop is shown in FIG. 1. Such a conventional positioning loop servo drives to a null condition when the input to the digital-to-analog converter (DAC) reaches zero. This system generally employs a computer controller 10 which provides position information concerning the ultimate destination, that is, the desired location of the table, vis-a-vis that of the E-beam. The destination information is fed to a subtractor 11 which also receives actual position data from a laser transducer 14. The difference signal represents the difference between destination position and actual position. The difference signal is fed to the digital-to-analog converter (DAC) 16 which is employed as an input to a conventional servo speed loop motor drive comprising amplifier 18, motor 20 and tachometer 22. In accordance with such conventional systems, the motor rotational speed information is sensed by tachometer 22 which provides a speed signal to the comparator amplifier 18 used to drive the motor 20 and hence, the X-Y table 24. As is apparent, when the input signal to the DAC 16 is zero, the actual position equals the destination position and the system has been driven into a null such that the motor is stopped.

Prior art X-Y positioning servo loops, as shown in FIG. 1, have a number of significant disadvantages. First, such servo loop systems tend to dither, that is, oscillate about the null point. Such oscillation results in a deterioration in throughput since the E-beam registration and/or write operation cannot occur until such oscillations have been effectively damped. Moreover, the energy inputs to such systems are generally constant and as a result, the X-Y stage tends to move at a constant speed until it reaches the null position where at that point braking occurs. This constant application of energy to the table is a further contributing factor to "ringing". Importantly, such prior art systems tend to operate within a rather wide deadband which is generally defined by constant signal inputs into the servo loop.

Such a technique of compensation for minimizing deadband are known in the prior art as shown, for example, in the U.K. Pat. No. 1,080,108. In the system of this prior art patent, digital compensation for the deadband in a servo mechanism is used but, the amount of compensation is predetermined. Specifically, a pair of counters are employed which cycle in synchronism at the same frequency such that the difference in the contents of one of the counters with respect to the contents of the other causes movement of the servo system. As a result, oscillation around the null point tends to occur when deadband compensation, such as shown in FIG. 2 of the reference is employed.

U.S. Pat. No. 3,701,992 relates to a device for minimizing the servo loop deadband in a recorder. It suffers from the same defects as the previous reference. In this patent, a second servo amplifier is placed in parallel with the main servo amplifier comparable to element 18 in FIG. 1 of the present application. The first amplifier produces an output proportional to the analog pin control input signal. A predetermined constant output signal is supplied by the second amplifier to overcome the deadband caused by friction encountered in the mechanical element, in that case, a graphical recorder. The outputs are summed to drive the servo motor. However, even in the '992 patent with the use of a second amplifier 43, coupled in parallel with the first amplifier 35, oscillations around the null point tend to occur. This is because, as in the case of the U.K. patent, a constant signal is used to reduce deadband. Since the deadband constants are recognized as not being the same over the totality of the range of movement, the deadband can never be completely eliminated when a constant signal is employed. That is, it is recognized that the deadband constants vary from one position to another in a X-Y stage and consequently the use of a constant signal will not completely eliminate the deadband.

U.S. Pat. No. 3,821,625 also relates to deadband compensation in a servo mechanism by employing a second amplifier with a predetermined fixed output voltage. This output, in the form of an incrementally small basic control signal causes sufficient energization to be applied to the device to initiate immediate movement of the driver element. The reference is therefore fundamentally no different from the remainder of the prior art in its application of a constant signal to reduce the deadband.

SUMMARY OF THE INVENTION

Given the disadvantages in the prior art, a requirement exists for defining the E-beam positioning system having accuracy commensurate with that of the E-beam registration and write operations. Moreover, such accuracy requirements must be combined with speed of movement to insure that adequate throughput is maintained. Such speed and accuracy of positioning must be achieved with the elimination of oscillation around the null point which is typical in prior art deadband compensation systems.

Accordingly, it is an object of this invention to overcome the speed and accuracy problems in prior art X-Y positioning subsystems for E-beam lithography tools.

It is another object of this invention to define an incremental servo system that is adaptive to apply only a sufficient amount of energy to the table to move it directly to the null position, thereby avoiding excessive energy which would disturb the total system structure.

A further object of this invention is to define a table positioning system which positions by applying drive voltages such that the table approaches null in a manner minimizing servo oscillation by having only a single overshoot of the null point.

Yet another object of this invention is to define a servo positioning subsystem that eliminates the requirement of predetermined constants used to reduce deadband.

These and other objects of this invention are attained using an adaptive driving system for a feedback control network in a X-Y positioning system. The electronic subsystem utilizes a gradually increasing drive voltage which is superimposed on a step wave. This signal is summed with the error or null signal to accurately position the system within the deadband. The drive voltage, while superimposed on the null voltage, increases until the system's mechanical friction and drift in the deadband is overcome. A function generator alters the null signal such that the combined null signal and drive voltage cause the system to approach the null point in a manner minimizing servo oscillations. When the null point is reached, both ramp and step generator signals are reset to zero. This resetting action avoids oscillation around the null point.

Another facet of the present system is the use of a limit circuit which employs both hysteresis and a time delay to insure that false signals are not given before the servo mechanism actually reaches the defined null position. In contemporary E-beam systems, the use of such a limit circuit provides an important advantage by relieving the control computer from having to read the actual table address. Determining actual table address is a time-consuming task and its elimination increase overall throughput for the tool. The limit circuit also performs an additional function by generating an error signal if the table moves out of the beam feedback range (null range) after first having come within that range.

These and other aspects of this invention will be explained in detail with reference to the attached drawing and the description of the preferred embodiment which follows.

DESCRIPTION OF THE PREFERRED EMBODIMENT

Figure 1:
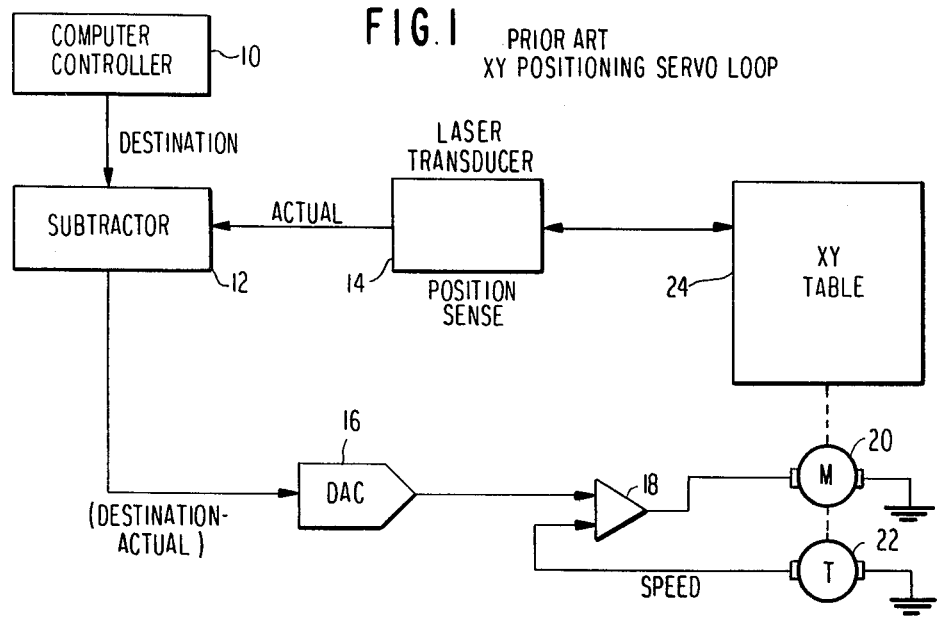
FIG. 1 is a block diagram of a prior art X-Y positioning servo loop.
Figure 2:
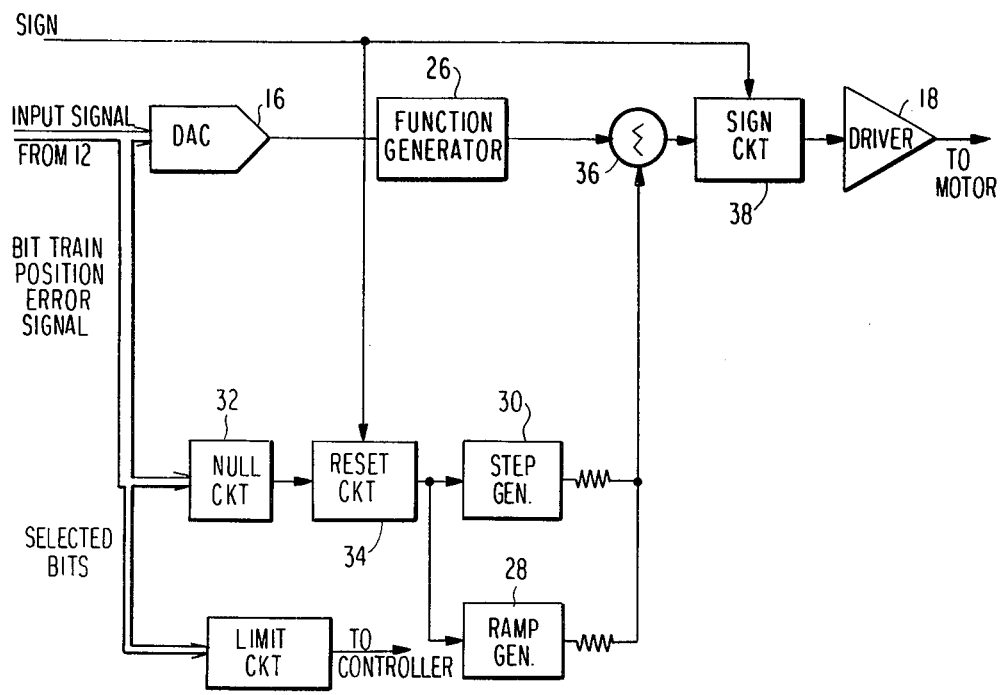
FIG. 2 is a block diagram showing the incremental servo loop components of the present invention.

Referring now to FIG. 2, a block diagram of the incremental servo loop components used in accordance with the present invention are shown. In FIG. 2, the digital-to-analog converter 16 is the same element as in the prior art FIG. 1 system as is the driver 18. The present invention as shown in FIG. 2 departs from the conventional system by the use of the additional elements shown in FIG. 2. The function generator 26 receives an input from the DAC 16 and comprises a nonlinear amplifier having a feedback element. The feedback element has a stepped response as shown in FIG. 3B which allows the amplifier to develop a larger proportion of drive for small signals than for large signals. Accordingly, the non-linear feedback element provides more drive during start-up at the beginning of a move for fast initial acceleration. The non-linear amplifier comprising the function generator 26 also provides for larger gain during the end portion of the move, that is, for purposes of braking or deceleration.

The feedback element may be adjusted by changing potentiometers such that the brake points shown in FIG. 3B can simply and dynamically be adjusted to match the variation in friction and tolerances that inexorably occur within any mechanical system yet, cannot be defined or predicted prior to actual use. That is, in any mechanical positioning system, the X-Y table and its associated motor drive will have its own unique frictional and motion characteristics which must be adjusted for in the drive electronics. Those adjustments cannot be defined prior to actual installation and use. Once set, the brake points shown in FIG. 3B need not be readjusted unless the mechanical system changes significantly as the result of excessive wear or a design or component change.

Figure 3A:
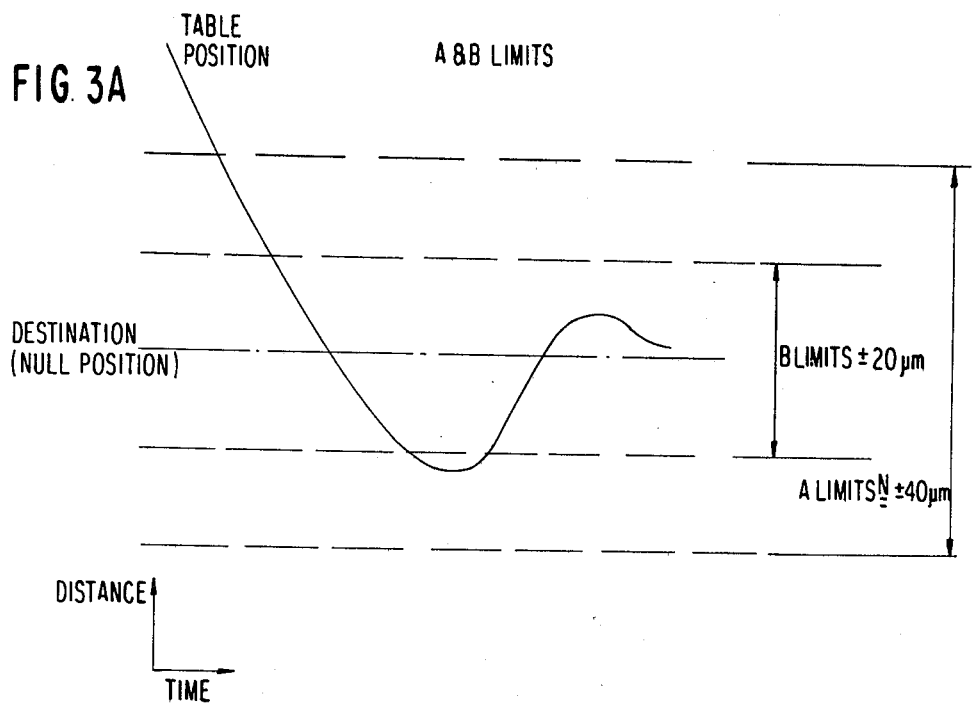
FIGS. 3A–3D are charts of salient system parameters to show operation of this invention.
Figure 3B:
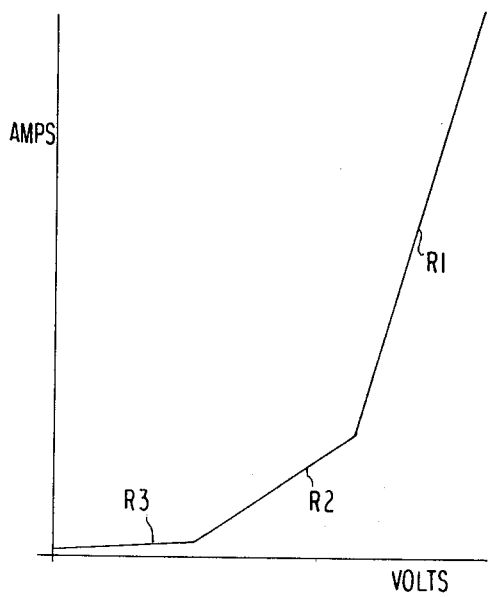
Figure 3C:
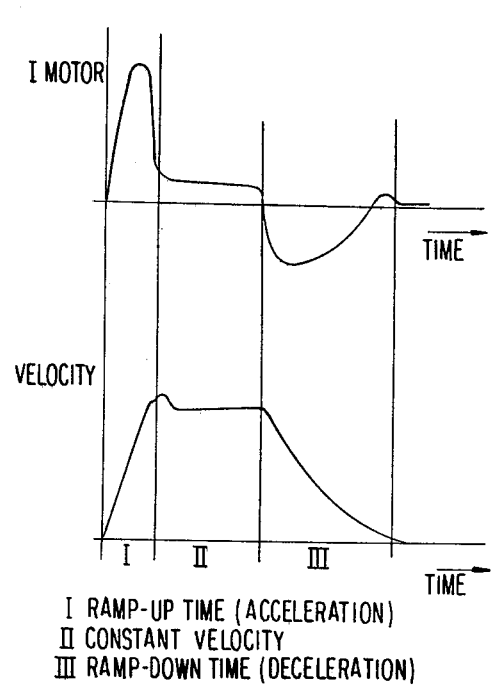

Referring now to FIG. 3C, the motor drive current supplied to motor 20 and the velocity of the X-Y stage are shown for a particular move. The move can be segmented into three regions; region I defined as the ramp-up time during which acceleration of the X-Y stage occurs, region II a period of constant velocity where the stages in translation from one position to another and region III defined as the ramp-down time where deceleration of the X-Y stage occurs until it reaches its null position. As shown in FIG. 3C, during the ramp-up time in region I, a large motor current is supplied to overcome the initial friction and to supply energy for acceleration necessary to reach the constant velocity achieved in region II. Once the velocity is reached in region II, only a small motor current is then required.

The ramp-down time region III is the most crucial for obtaining a short move time. The brake points in the function generator are adjusted to provide the motor current. Im waveform shown in FIG. 3C as the upper curve. This Im waveform has been demonstrated to be relatively independent of a particular X-Y stage and the waveform shown in FIG. 3C is optimal for achieving fast move times. During the ramp-down time, frictional forces tend to aid deceleration and accordingly, the amplitude of the current Im is not as large during the ramp-down time in region III as it is during the ramp-up time in region I. In particular, as shown in FIG. 3C, a desirable small angle crossover of Im occurs at the end of region III. The function of this crossover is to reverse the forces that have been applied to the X-Y table and drive the components to relieve stresses in these members. By applying a force to relieve the stresses in the X-Y stage, the members are relaxed and stabilized quickly. Correspondingly, the table comes to a motionless stop faster than the case where the stresses relax as a result of harmonic oscillation (ringing).

Referring back to FIG. 2, a ramp generator circuit 28 and a step generator circuit 30 are placed in parallel with the function generator. The step generator 30 compensates for minimum deadband or deadzone in the X-Y stage. As recognized in the prior art, this deadband is well known and is not a constant over the range of travel of any mechanical system. Therefore, using a constant step amplitude will not provide a solution for direct compensation for the deadband. In accordance with the present invention, a second generator, a ramp generator 28 is used in addition to the step generator 30.

If the system is not at the null position, a null circuit 32 receiving a parallel input, that is, the same input applied to the DAC 16, generates an output signal. The output signal of the null circuit 32 passes through a reset circuit 34, whose function is to be described herein, and causes a voltage step to be generated by the step circuit 30 and starts a voltage ramp from the ramp generator 28. The ramp voltage and the step voltage are fed into a summing junction 36 together with the function generator 26 output. The summed output enters the main servo loop into the sign circuit 38. The ramp signal continues to increase until the system reaches the null condition at which time the step and ramp voltages are reset to zero by the action of the reset circuit 34.

The reset circuit 34 receiving a signal along the "sign" line resets on either a positive or negative transition from the "sign" input. Accordingly, the reset circuit resets the incremental servo system to zero whenever the position of this system crosses zero, that is, crosses the null position.

As a result, the ramp generator and the step generator are reset whenever the servo error signal crosses zero or the system is at null.

Figure 3D:
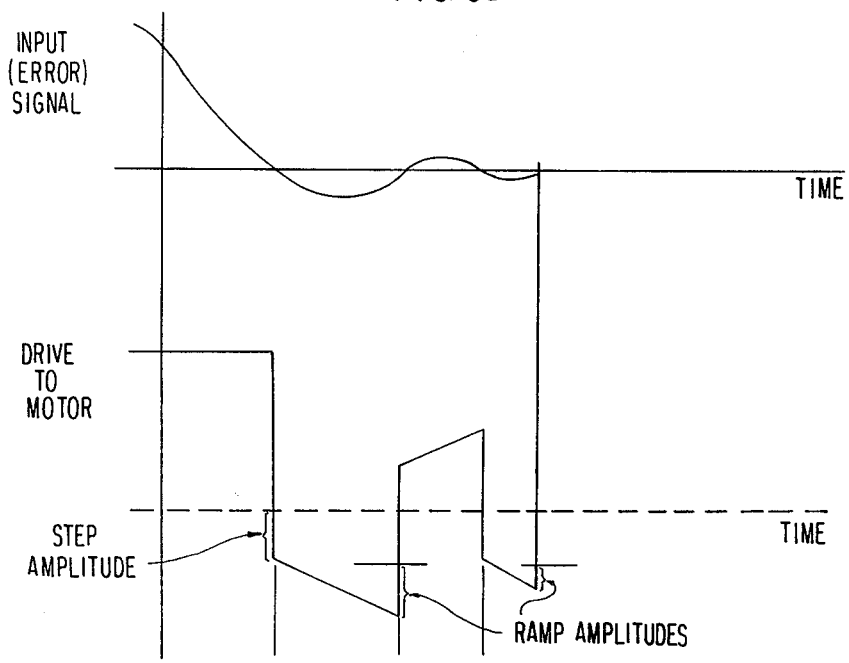

Referring to FIG. 3D, typical waveforms for the rampstep operation are shown. FIG. 3D shows two waveforms; the first is the input error signal denoted as the input signal to the DAC 16 and the null circuit 32 and the second, a time varying signal, namely the ramp-step operation as a function of the signal to drive the motor. As shown in those two waveforms, the ramp generator applies an ever increasing signal to the servo motor and overcomes initial frictional forces or deadband range required to move the mechanical stage back to the null position. Accordingly, variations in the deadband and mechanical friction, tolerances and the like of the X-Y stage over the range are overcome and accordingly, the X-Y stage drives to within a very narrow null range.

FIG. 3D shows that the ramp and step generator are set to zero whenever a null point is crossed. That is, when the input signal (error signal) crosses zero, both the ramp generator 28 and the step generator 30 are reset. This technique avoids the tendency of dithering, that is, small amplitude oscillations around the null point which occur whenever deadband compensation typical of the prior art is used.

Accordingly, the system of FIG. 2 is capable of driving the table to a very accurate null point, $\pm 0.1$ $\mu$m ultimately $\leq 0.01$ $\mu$m. The system is adaptive since the ramp voltage increases in amplitude until it reaches the necessary drive to overcome the friction of the mechanical stage. Consequently, the system of FIG. 2 eliminates the requirement of a high loop gain in the servo loop yet achieves a very accurate positioning of the X-Y table. Because the system is active, the X-Y table may make very small correction moves at any time. A separate feedback from the table position sensors is fed back to the E-beam through the magnetic yoke to keep the beam origin to mechanical relationship constant, $\pm 0.05$ $\mu$m. The feedback channel is purely electrical and therefore faster than any mechanical loop.

Such beam feedback is a technique of open loop deflection of the electron beam in the E-beam system which compensates for table position. The result is a loop maintaining the relative position of the E-beam and the X-Y stage at a constant value. While beam feedback techniques are known, an important characteristic of this technique in the context of the present invention is to relieve the X-Y table from having to be driven to a completely stable null position before the E-beam writing and/or registration operation can begin.

Figure 4:
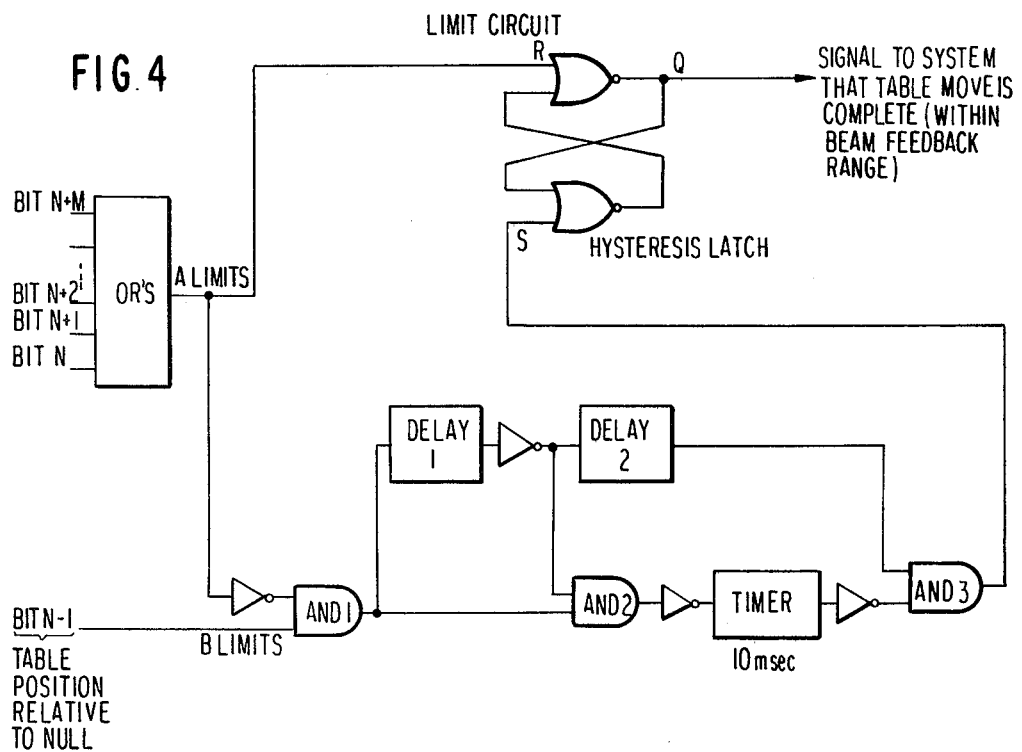
FIG. 4 is a circuit diagram showing the limit circuit in accordance with the present invention.

Referring now to FIG. 3A and FIG. 4, the limit circuitry of this invention is shown. FIG. 3A shows a plot of table position as a function of distance and time. The null or central position is shown defined centrally between two limits, "A" limits of N$\pm$40 $\mu$m and inner or "B" limits of N$\pm$20 $\mu$m.

FIG. 4 shows the limit circuit utilized in accordance with this invention employing both hysteresis and time delay to enable beam feedback operation. The limit circuit of FIG. 4 uses a portion of the bit train input that is the digital position error signal used by the servo loop of FIG. 2. It provides an output signal, Q, when the table position is within the inner or "B" limit and remains there for a predetermined period of time. Such a period of time may typically be in the range of 10 ms. The output signal remains active unless the table moves to a position outside the "A" or outer limit. This hysteresis in time delay prevents the issuing of a false signal to the system controller 10. Such a signal indicates that the system is within the range of the circuits in the beam feedback loop (not shown) and may constitute a system signal to begin E-beam registration and/or writing. It follows, therefore, that a false or premature signal would cause an erroneous product to be registered or written.

Another advantage of utilizing the limit circuit of FIG. 4 is that the computer controller 1 is relieved of the responsibility of having to read actual table position addresses to determine when the table move is complete. Accordingly, when the output signal is generated, the system controller is then informed that the move is complete and the X-Y tables within the range of the circuits comprising the beam feedback loop.

As shown in FIG. 4, the limit circuit receives a digital input signal representative of table position relative to the null position, that is, the output of the subtractor 12.

Only a portion of the data bit train is employed, hence as shown in FIG. 2 the data bus input to the limit circuit indicates that only selected bits are utilized. Bits N through N+M are inputted to an OR array producing a first signal indicative of whether the table position is within the A limits of FIG. 3. Bit N−1 is used as a separate input to AND 1 to indicate whether the system is within the B limits. The lower portion of the limit circuit delays setting the latch until the system has remained inside the B limits for a predetermined period of time. If both conditions are satisfied a first delay, Delay 1 typically 200 nsec. is actuated followed by a triggering pulse to AND 2 which actuates the timer. The second delay, Delay 2 typically 500 nsec. compensates for internal delays through the inverter and timer and triggers with the timer output delayed by 10 msec. AND 3 to set the latch S. It is therefore apparent that with the limiter circuit there will be no Q output until the system is within the A and B limits and remains there for a predetermined period of time. Moreover, once the latch has been set, the Q output will continue until the system is outside the A limit.

It is apparent then that the present invention provides an adaptive driving system used in the feedback control network of a X-Y positioning system. A gradually increasing drive voltage derived from the ramp generator is superimposed upon the step wave from the step generator and is then summed with the error or null signal to actively position the system within the deadband. The function generator alters the null signal such as the combined null signal and the drive signal cause the system to approach the null point in a manner that eliminates servo oscillations and permits only a single overshoot of the null point to take place. Limit circuitry is used to generate a pulse when the table comes within the range of beam feedback and by means of a time delay and hysteresis insures that false signals are not issued. Accordingly, system throughput and high accuracy are achieved.

It is apparent that modifications of this system may be practiced without departing from the essential scope of this invention.

We claim:

1. A positioning system for moving a structure to a predetermined position comprising:
   motor means to move said structure;
   means to sense the position of said structure as it is being moved;
   means to produce an error signal representing the difference between the predetermined and actual positions;
   signal generating means responsive to said error signal for generating a voltage which increases, in amplitude rapidly when compared with said error signal; and
   summing means for combining said error signal and said voltage for producing a drive voltage to said motor means.

2. The system of claim 1 further comprising a null circuit responsive to said error signal and triggering said signal generating means to produce said voltage having a polarity the same as said error signal.

3. A feedback control system for positioning an X-Y table comprising:
   means for sensing the actual position of said table and producing an output signal;
   means receiving a first signal indicative a desired predetermined table position and a second signal comprising said output signal and producing an error signal;
   signal generating means for generating a voltage rapidly increasing in amplitude with respect to said error signal;
   null circuit means responsive to said error signal for triggering said signal generating means to produce a voltage having a polarity the same as said difference signal; and
   summing means for combining said error signal with said voltage to produce a drive voltage that overcomes X-Y table friction and deadband drift to direct said table to said desired position; and
   motor means receiving said drive voltage for moving said X-Y table.

4. The system of claim 1, 2 or 3 further comprising a function generator receiving said error signal and changing the amplitude of said error signal as a function of the magnitude of said error signal, said changed error signal supplied to said summing means.

5. The system of claim 1, 2 or 3 wherein said signal generating means comprises a step generator in parallel with a ramp generator wherein said voltage comprises a gradually increasing drive voltage superimposed upon a step voltage which is supplied to said summing means.

6. The system of claim 5 further comprising a reset circuit for resetting said ramp generator and said step generator to zero whenever said error signal is zero.

7. The system of claim 6 further comprising a sign circuit responsive to the sign of said error signal and reversing the polarity of drive voltage whenever the polarity of said error signal changes.

8. The system of claim 4 further comprising a digital to analog converter to change said error signal into an analog voltage.

9. The system of claim 1, 2 or 3 further comprising a limit circuit responsive to said error signal and producing a range output signal when said error signal is within a first limit and terminating said range output signal when said error signal exceeds a second limit, wherein said first limit is closer to said predetermined position than said second limit.

10. The system of claim 9 wherein said limit circuit comprises a time delay element to delay the generation of said range output signal until said error position is maintained within said first limit for a predetermined time.

11. The system of claim 9 further comprising a system controller receiving said range output signal and initiating a substantive operation in response thereto.

* * * * *